Jan. 17, 1939.  C. J. FRANKFORTER  2,144,051
METHOD OF TREATING WATER
Filed Oct. 29, 1935
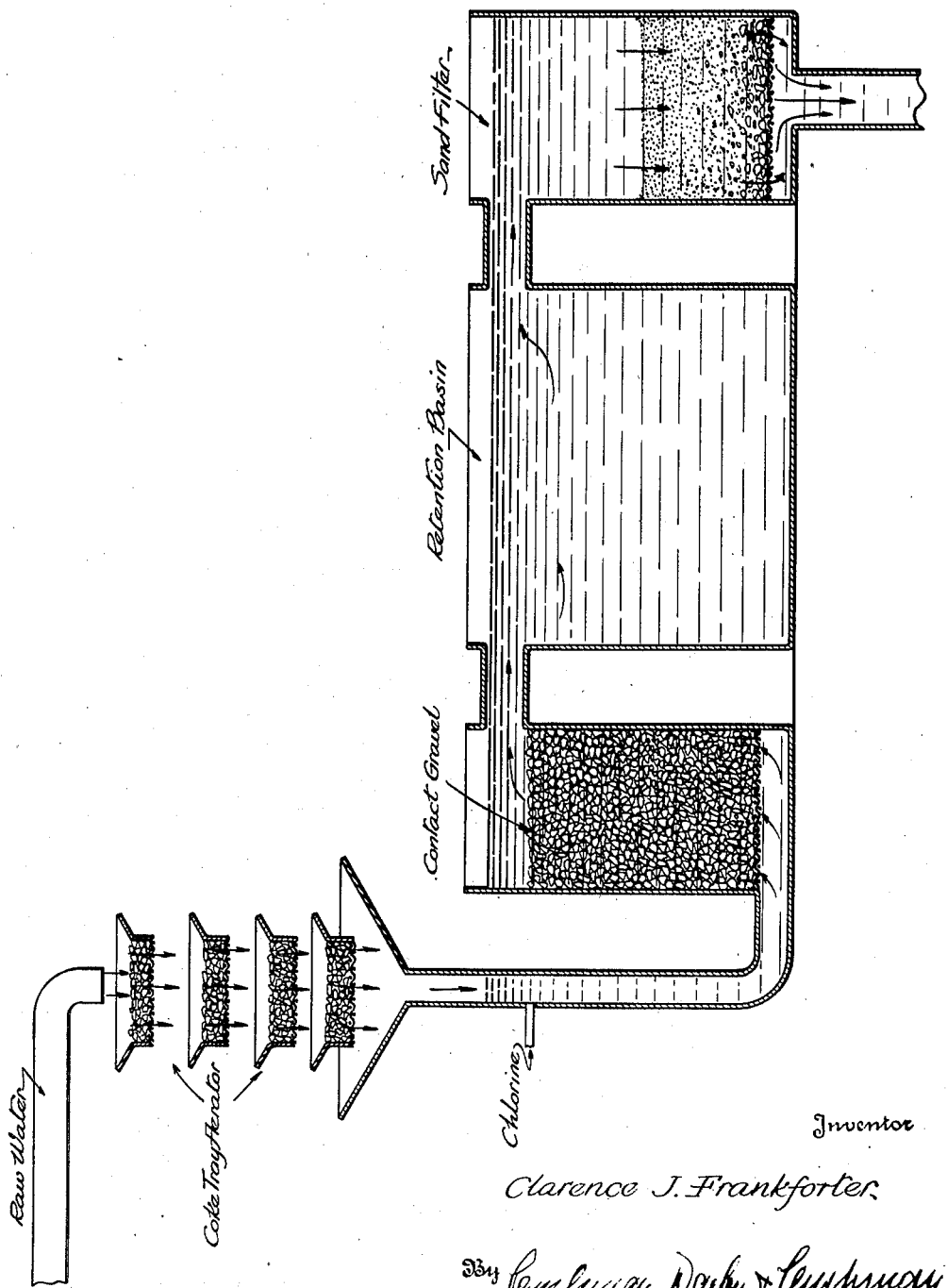
Inventor
Clarence J. Frankforter Patented Jan. 17, 1939

2,144,051

UNITED STATES PATENT OFFICE 2,144,051

METHOD OF TREATING WATER

Clarence J. Frankforter, Lincoln, Nebr.

Application October 29, 1935, Serial No. 47,325

6 Claims. (Cl. 210—16)

This invention relates to the treatment of water for the purpose of removing certain impurities contained therein, such as salts of iron and manganese, and especially salts containing ferrous and manganous ions.

Water in many regions often becomes unfit for drinking and other domestic purposes because of the presence therein of relatively large quantities of ferrous and manganous ions. These ions occur in quantities upward of one part per million and have a tendency to cause precipitation and corrosion. In addition, many of the iron and manganese compounds found in water become readily hydrolized and ionized in such a way as to impart an acid reaction to the water.

It is old to sterilize water by continuously adding an excess of either gaseous chlorine or an aqueous solution of chlorine to the water in a continually moving stream, passing the chlorinated water over substances which cause the heavy metal compounds dissolved in water to separate out, and then passing the water over carbon in sufficient quantity to convert the excess chlorine into the chlorine ion; but no previous methods of water treatment have been concerned with the rapid removal of ferrous and manganous ions from large quantities of water with an exceedingly small amount of chlorine, i. e., an amount which is insufficient to spoil or otherwise render the water unfit for drinking or domestic uses generally. Although some sterilization of the water takes place in the process of the present invention, it is primarily for the purpose of removing the undesirable ferrous and manganous ions.

It is an object of this invention to devise a process for treating otherwise pure and drinkable water to rid such water of the greater portion of its iron and manganese content.

A further object of the invention is to provide a method of removing the iron and manganese compounds, which are usually present in the form of their lower, relatively soluble oxides, by converting these oxides into higher oxides which are readily coagulatable and removable, and accomplishing this without rendering the water unfit for domestic consumption in any way.

In carrying out the process the water is first aerated so as to increase its pH value and render it slightly alkaline. It is then treated with small quantities of chlorine, and passed through a contact bed, after which it is permitted to coagulate by standing and is finally filtered through ordinary sand or other similar filters.

The various steps constituting the present invention will be clearly understood upon referring to the accompanying drawing, which represents a flow sheet of the entire process to which the water is exposed. The raw water is permitted to flow over or spill upon a series of superimposed or vertically arranged trays containing particles of coke or any similar material of suitable size. Coke particles which will pass a 2 mesh screen and be retained by a 4 mesh screen have been found suitable, but any size may be employed as well as any mineral matter which is porous in character, insoluble in water, and has a relatively rough surface or is otherwise similar in properties to coke. Any number of trays, spaced a suitable distance above each other, may be used, so that the water must pass over and through the coke particles on each tray, thereby becoming thoroughly aerated and saturated with oxygen or air.

The aeration of the water causes a diminution in the amount of dissolved carbon dioxide contained in the raw well water being treated, and simultaneously increases the pH value of the water, i. e., diminishes its acidity. Although the water does not become appreciably alkaline as a result of this treatment, its pH value usually varies from about 7.3 to 7.6, and may go as high as 8.0. Satisfactory results have been obtained with a pH as high as 9.0 and as low as 7.0, but when the pH value remains below 7.0, the advantages of the present invention are substantially absent, and the subsequent steps of the process produce decidedly inferior results.

It is also possible to increase the pH value by other means as by adding lime or other alkaline compound. Furthermore, satisfactory results may be obtained by chlorinating the water first and then adding the lime, as it is a primary object to change the water over to the alkaline side, and thereby remove substantially all the carbon dioxide contained in the water and render the oxides formed more insoluble.

The water next falls or flows or is otherwise conducted into a pipe, chamber or compartment where chlorine is introduced. The quantity of chlorine employed, which may be in gaseous form or dissolved in a suitable solvent, such as water, averages about 0.25 part per million, and seldom exceeds 0.5 part per million. It is highly desirable to avoid any excess chlorine, as larger quantities yield water which is unfit for drinking and domestic purposes generally.

Some sterilization of the water takes place as a result of the chlorination, but the primary purpose of exposing the water to chlorine is to oxidize the salts of iron and manganese to their higher oxides so that they will precipitate out and can then be removed, as by the steps to be described. As is well known, chlorine is capable of decomposing water and uniting with the hydrogen in the water, at the same time liberating oxygen. It is the oxygen so formed which acts upon the iron and manganese compounds, resulting in their oxidization and transformation into precipitable salts.

In accordance with the present invention, very small quantities of chlorine are capable of oxidizing the salts in exceedingly large quantities of water, as the preliminary aeration and increase in the pH value of the water renders the employment of large quantities of chlorine unnecessary. This is exceedingly advantageous, since any large amount of halogen has well known deleterious effects on drinking or other similar waters.

The chlorine may be introduced by means of any chlorinating apparatus, such as an ordinary Wallace and Tiernan chlorinator, but some difficulty is encountered in direct introduction from the cylinder owing to the small amount of chlorine gas required. It has therefore been found preferable to first prepare a solution of chlorine in water of predetermined concentration, and then to add a measured amount of this chlorine solution to the stream of raw well water.

After chlorination, the water is conducted through a contact bed of gravel at the rate of two gallons per cubic foot of gravel per minute. The gravel may be common washed gravel or may be of any suitable size, a material graded to pass through a 4 mesh screen and retained by a 10 mesh screen having been found satisfactory. Other materials, which are physically and mechanically similar to gravel, may be used.

As the water passes through the contact bed, the pieces of gravel become coated with hydrated oxides of iron and manganese. These deposits of oxides have a certain catalytic effect, and facilitate the transformation of the lower metal oxides into the higher coagulatable oxides, at the same time fostering precipitation and coagulation. When the coating of oxides on the gravel becomes excessive and interferes with the passage of water through the contact bed, the bed of material may be washed by reversing the flow at a slightly increased rate.

The water is next conducted to a retention basin, where the rate of flow is reduced sufficiently to permit normal hydration and coagulation of the iron and manganese oxides or the water may be retained in this basin, which is preferably covered, from one to three hours. It is unnecessary to employ a coagulating agent, as the preceding steps produce a precipitate which is self-coagulating either instantly or after a relatively short period of retention in the retention basin. As the precipitated material becomes coagulated, a certain percentage, varying from 15 to 20% drops down to the floor of the basin by sedimentation, and may be removed from time to time by washing or flushing out the basin.

The water containing any unsettled precipitates is finally conducted to a sand filter, such as a standard graded sand filter commonly used in gravity flow sand filter processes. These filters accomplish the final clarification of the water by gravity filtration, and may be back-washed in the usual manner, when sufficient precipitated material has accumulated on the sand particles to slow down or otherwise interfere with the flow of water therethrough. The water normally flows at a rate of between two and six gallons per square foot of filter surface per minute through this filter, and comes out as finished water which is substantially free of iron and manganese, containing as low as 0.02 to 0.03 part per million of these substances, and is otherwise purer and more suitable for domestic consumption.

It has been found that, where iron salts only are to be removed, it is not necessary to pass the water through the contact bed, and furthermore it is not always essential to expose the water to the period of retention and the sand filtration. Most waters, however, containing iron and manganese salts, were most efficiently relieved of these materials by subjecting the water to the combined contact and retention periods as well as the sand filtration.

It will be understood that the aeration of the water in accordance with this invention is controlled, and that the water is exposed to aeration only long enough to obtain the desired pH value, which is preferably between 7.3 and 7.6, although slight variations from these values have been found satisfactory.

The drawing is merely exemplary of one arrangement of apparatus for producing water which is free of iron and manganese in accordance with the present invention. It is to be understood that this invention is not to be restricted in any manner, and that it is entitled to a reasonable range of equivalents.

I claim:

1. A process for treating water containing oxidizable metallic salts having ferrous and manganous ions which comprises increasing the pH value of the water above its normal pH value so that the water has a pH of substantially 7.0, treating the water with chlorine and oxidizing the metallic salts to precipitatable compounds, and removing the resultant precipitates.

2. A process for treating water containing oxidizable metallic salts having ferrous and manganous ions which comprises aerating water to increase the pH value thereof to substantially pH 7.0, exposing the water to chlorine in amount to oxidize said salts and form precipitatable compounds, and removing the precipitated material.

3. A process for treating water which comprises raising the pH value of water above its normal pH value and so that it has a pH on the alkaline side of neutrality, exposing the water to chlorine, passing the treated water through a contact bed, and removing the precipitated material formed.

4. A process for treating water containing oxidizable metallic salts having ferrous and manganous ions which comprises raising the pH value of water above its naturally occurring pH value and so that it has a pH on the alkaline side of neutrality, oxidizing the salts in the water to a precipitated state by subjecting the water to the action of chlorine, exposing the chlorinated water to a catalyst, passing the water through a coagulating and settling chamber, and removing the precipitated material which does not settle by filtration.

5. A process for treating water which comprises raising the pH value of water containing oxidizable metallic salts having ferrous and manganous ions above its naturally occurring pH value and so that it has a pH on the alkaline side of neutrality, oxidizing the said salts in the water to a precipitated condition by subjecting the water to the action of chlorine, passing the water containing the precipitated material through a porous substance thereby coating the porous substance with a portion of the precipitated material and catalytically effecting the precipitation of additional precipitatable material, passing the water through a coagulating and settling chamber, removing the settled material, and filtering the water to remove the remainder of the precipitated material.

6. A process for treating water containing oxidizable metallic salts having ferrous and manganous ions which comprises raising the pH value of the water above its naturally occurring pH value and so that it has a pH on the alkaline side of neutrality, subjecting the water to the action of chlorine thereby oxidizing the greater portion of the said salts in the water to a precipitated condition, passing the water over a catalyst in order to precipitate additional precipitatable material, coagulating the precipitated material, and removing the precipitated and coagulated material by sedimentation and filtration.

CLARENCE J. FRANKFORTER.